(12) United States Patent
Wood

(10) Patent No.: US 6,525,919 B2
(45) Date of Patent: Feb. 25, 2003

(54) CURRENT LIMITING SWITCH AND RELATED METHOD

(75) Inventor: Grady M. Wood, Satellite Beach, FL (US)

(73) Assignee: Intersil Americas Inc., Irvine, CA (US)

( * ) Notice: Subject to any disclaimer, the term of this patent is extended or adjusted under 35 U.S.C. 154(b) by 0 days.

(21) Appl. No.: 09/862,990

(22) Filed: May 22, 2001

(65) Prior Publication Data

US 2002/0097545 A1 Jul. 25, 2002

Related U.S. Application Data

(60) Provisional application No. 60/263,974, filed on Jan. 24, 2001.

(51) Int. Cl.$^7$ ................................................. H02H 3/00
(52) U.S. Cl. ........................................................ 361/93.9
(58) Field of Search ............................... 361/93.1, 93.7, 361/93.9; 323/908

(56) References Cited

U.S. PATENT DOCUMENTS

| | | | |
|---|---|---|---|
| 4,718,084 A | * | 1/1988 | Dragotin ..................... 379/412 |
| 5,184,036 A | * | 2/1993 | Kesleret ..................... 307/540 |
| 6,169,425 B1 | | 1/2001 | Spires et al. .................. 327/56 |
| 6,222,417 B1 | * | 4/2001 | Chevallier .................. 330/262 |

OTHER PUBLICATIONS

Phillips, The HC–5502X/4X Telephone Subscriber Line Interface Circuits (SLIC), Jan. 1997, pp. 4–1 to 4–17.

* cited by examiner

Primary Examiner—Matthew Nguyen
(74) Attorney, Agent, or Firm—Allen, Dyer, Doppelt, Milbrath & Gilchrist, P.A.

(57) ABSTRACT

A switch includes first and second switch terminals, at least one output MOS transistor for selectively connecting the first and second switch terminals, and a driving current source for driving the at least one output MOS transistor. The switch may also include a current limiter for limiting the driving of the at least one output MOS transistor by the driving current source to establish a current limit. Furthermore, a controller may be included for the current limiter for controlling the current limit, such as by causing the current limiter to decrease the current limit based upon an increase in temperature of the integrated circuit or at periodic intervals to control rise and fall times of the at least one output MOS transistor.

38 Claims, 4 Drawing Sheets

CURRENT LIMITING SWITCH AND RELATED METHOD

RELATED APPLICATION

The present application is based upon co-pending provisional application Ser. No. 60/263,974 filed Jan. 24, 2001, which is hereby incorporated herein in its entirety by reference.

FIELD OF THE INVENTION

The present invention relates to the field of electronic circuits, and, more particularly, to current limiting devices, such as for use in a telephone network, for example.

BACKGROUND OF THE INVENTION

A telephone network typically includes numerous switch offices which may be connected together via transmission lines, wireless links, etc. Switch offices are connected to individual local telephone subscribers by subscriber loops. Each loop includes tip and ring wires carrying signals from the switch office to the telephone and from the telephone to the switch office.

A subscriber line interface circuit (SLIC) is typically used as the primary interface between the subscriber loop and the switch office. A SLIC may include respective circuitry connected to the tip and ring lines. Because of the inductive nature of telephone lines, interruptions of ringing current, etc. can cause impulse noise on the lines. One method for controlling such impulse noise is to control the time and rate of switching on the loop using solid state switches connected to the tip and ring circuitry, for example. Such switches typically include one or two output metal oxide semiconductor (MOS) transistors, such as diffused MOS (DMOS) transistors, depending upon whether the switch is a unidirectional or a bidirectional switch, respectively.

When switching time and rate control is used, an accurate control of the switching delay and rise and fall times are required over the operating temperature of the switch, as well as over process variations associated with the manufacturing process. Furthermore, in such solid state switches, it is typically necessary to limit the current of the switch to protect against fault conditions, such as power surges, and to prevent the temperature of the switch from reaching critical limits which may cause premature failure.

Prior art current limiters for such solid state switches often include one or more sensing resistors which are used to set a current limit for the switch. One example of such a prior art switch is disclosed in U.S. Pat. No. 6,169,425 to Spires et al. entitled "Voltage Sensing Current Foldback Switch Circuit". This circuit includes a voltage sensing circuit having a switch circuit for sensing a switch voltage and a switch current, a voltage comparison circuit connected to the switch circuit for comparing the switch voltage to a limiting voltage, and a current limiting circuit connected to the switch circuit and the voltage comparison circuit. The current limiting circuit is capable of limiting the switch current when the switch voltage reaches or exceeds the limiting voltage.

The current limit of such prior art switches will generally depend upon the ability to accurately control the value of the sensing resistor(s) during manufacture. Furthermore, the current limit in such switches may also vary with device temperature. That is, as the temperature increases, the current limit generally decreases. Yet, prior art switches typically do not allow the shape of the current limit versus temperature curve to be controlled sufficiently to provide adequate fault protection in certain applications.

Additionally, the delay and rise and fall times in prior art switches are typically controlled by controlling the magnitude and timing of the current driving the output MOS transistor(s). This method works reasonably well for controlling the delay time, but actual turn on and turn off times may not be adequately controlled in certain applications.

SUMMARY OF THE INVENTION

In view of the foregoing background, it is therefore an object of the invention to provide an integrated circuit and related method which provides enhanced control of current limit with respect to temperature as well as delay and switching time.

This and other objects, features, and advantages in accordance with the present invention are provided by an integrated circuit including first and second switch terminals, at least one output MOS transistor for selectively connecting the first and second switch terminals, and a driving current source for driving the at least one output MOS transistor.

The integrated circuit may also include a current limiter for limiting the driving of the at least one output MOS transistor by the driving current source to establish a current limit. Furthermore, a controller may be included for the current limiter to control the current limit.

More specifically, the controller may cause the current limiter to decrease the current limit based upon an increase in temperature of the integrated circuit. Also, the controller may cause the current limiter to decrease the current limit at periodic intervals to control rise and fall times of the at least one output MOS transistor.

The controller may include at least one control current source providing at least one control current to the current limiter and at least one limiting resistor connected between the at least one control current source and the at least one output MOS transistor. Further, the at least one control current source may include first and second control current sources.

According to one embodiment, the first control current source may be connected to the current limiter, the at least one MOS output transistor may have a conduction terminal connected to the first switch terminal, and the second control current source may be connected to the second switch terminal. A diode may connect the second control current source to the second switch terminal. Moreover, the first control current source may be a KT/Q current source, and the second control current source may be a $V_{BE}/R$ current source.

According to another embodiment, the at least one output MOS transistor may include first and second output MOS transistors connected in series between the first and second switch terminals. The current limiter may include first and second bipolar transistors for respectively controlling driving of the first and second MOS transistors by the driving current source. The first and second control current sources may each respectively be connected to the first and second bipolar transistors. Also, the at least one limiting resistor may include a first limiting resistor connected between the first control current source and the first output MOS transistor and a second limiting resistor connected between the second control current source and the second output MOS transistor.

Additionally, the current limiter may include at least one sensing resistor connected between the first and second switch terminals. The current limiter may control driving of the at least one output MOS transistor based upon a voltage drop across the at least one sensing resistor. Also, the at least one limiting resistor may have a greater resistance than the at least one sensing resistor.

A switch according to the invention for limiting a current on a telephone subscriber loop may include first and second switch terminals connected in series in the loop, at least one output MOS transistor for selectively connecting the first and second switch terminals, and a driving current source for driving the at least one output MOS transistor. The switch may also include a current limiter for limiting the driving of the at least one output MOS transistor by the current source to establish a current limit. Additionally, a controller may provide at least one control current to the current limiter so that the current limit changes based upon the at least one control current.

A method aspect of the invention is for limiting current in an integrated circuit comprising first and second switch terminals and at least one output MOS transistor for selectively connecting the first and second switch terminals. The method may include driving the at least one output MOS transistor using a driving current source, limiting the driving of the at least one output MOS transistor by the driving current source to establish a current limit, and controlling the current limit using a controller.

More specifically, controlling the current limit may include decreasing the current limit based upon an increase in temperature of the integrated circuit so that the current limit decreases. Controlling the current limit may also include decreasing the current limit at periodic intervals to control rise and fall times of the at least one output MOS transistor. Further, limiting the driving of the at least one output MOS transistor may include connecting at least one sensing resistor between the first and second switch terminals and driving the at least one output MOS transistor based upon a voltage drop across the at least one sensing resistor.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and double prime notation are used to indicate similar elements in alternative embodiments.

Figure 1:
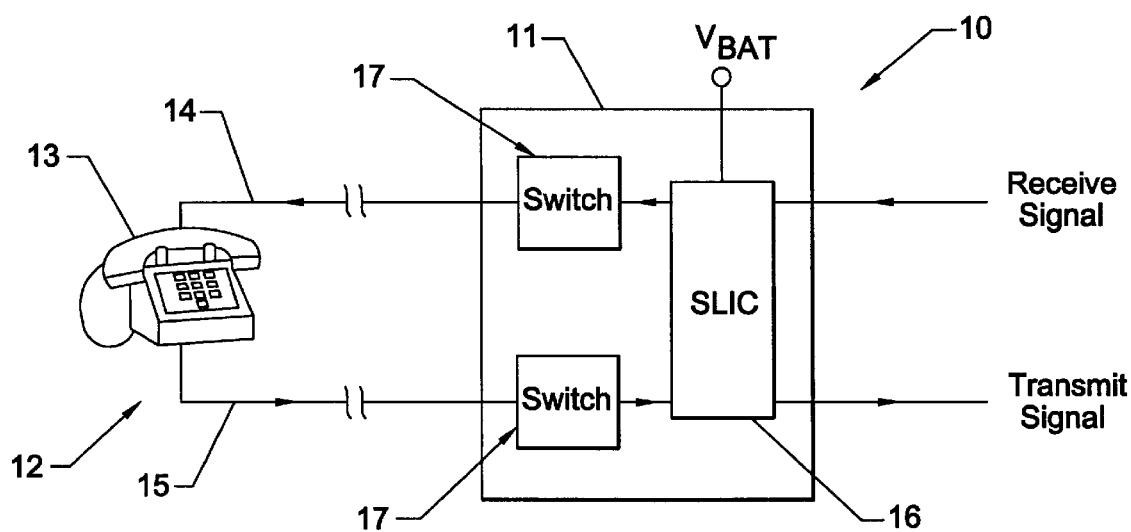
FIG. 1 is a schematic block diagram of a simplified telephone network including switches according to the invention.

Referring now to FIG. 1, a telephone network 10 includes a line card 11 which provides an interface between a telephone 13 and a telephone switch office (not shown). A subscriber loop 12 including tip and ring wires 14, 15 connects the line card 11 with the telephone 13, as will be appreciated by those of skill in the art. The line card 11 may include a subscriber line interface circuit (SLIC) 16 which is the primary interface between the four wire, low voltage switch environment of the switch office and the two wire, high voltage subscriber loop 12. As noted above, typical SLICs include tip and ring circuitry which is used to provide a DC voltage $V_{BAT}$ across the loop from a battery at the switch office when the telephone 13 is off hook (i.e., when the loop is closed). The voltage $V_{BAT}$ is typically −48V.

Figure 2:
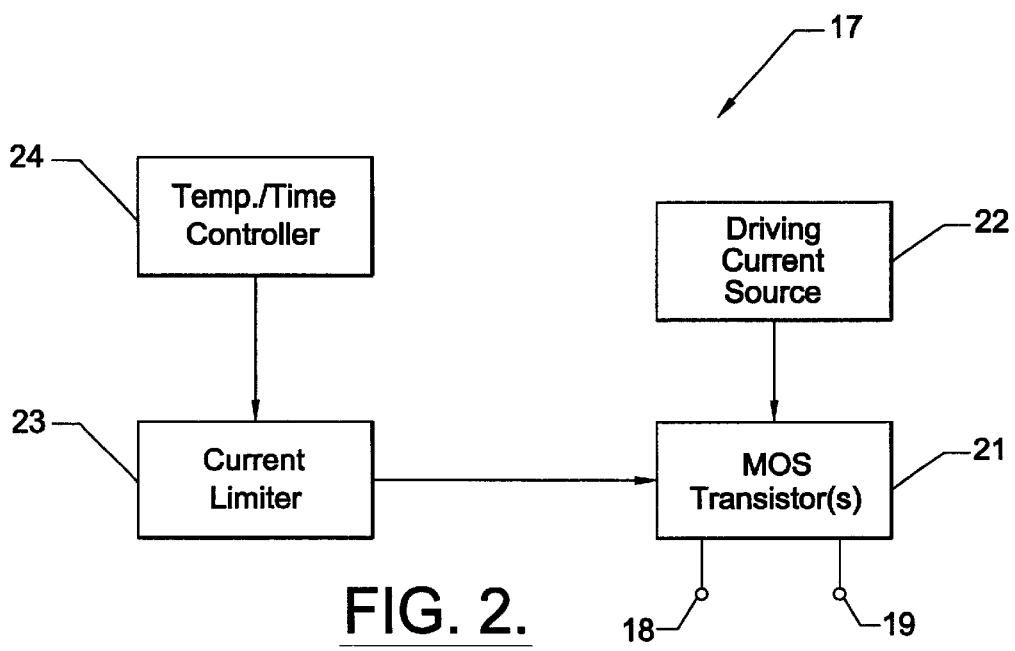
FIG. 2 is a schematic block diagram of a switch of FIG. 1 according to the invention.

According to the invention, switches 17 may be connected to the tip and ring circuitry of the SLIC circuit 16 for performing current limiting on the loop 12 as well as controlling delay and rise and fall times. The switch 17 according to the invention is functionally illustrated in FIG. 2. Each switch 17 may include first and second switch terminals 18, 19 connected in series in the subscriber loop 12. At least one output MOS transistor 21, such as a DMOS transistor, may be used for selectively connecting the first and second switch terminals 18, 19.

A driving current source 22 may be used to drive the at least one output MOS transistor 21, for example, though other suitable drivers known to those of skill in the art may also be used in accordance with the invention. Furthermore, a current limiter 23 is used for limiting the driving of the at least one output MOS transistor 21 by the driving current source 22 to establish a current limit. Also, a controller 24 controls the current limiter 23 to control the current limit, as will be described further below.

Figure 3:
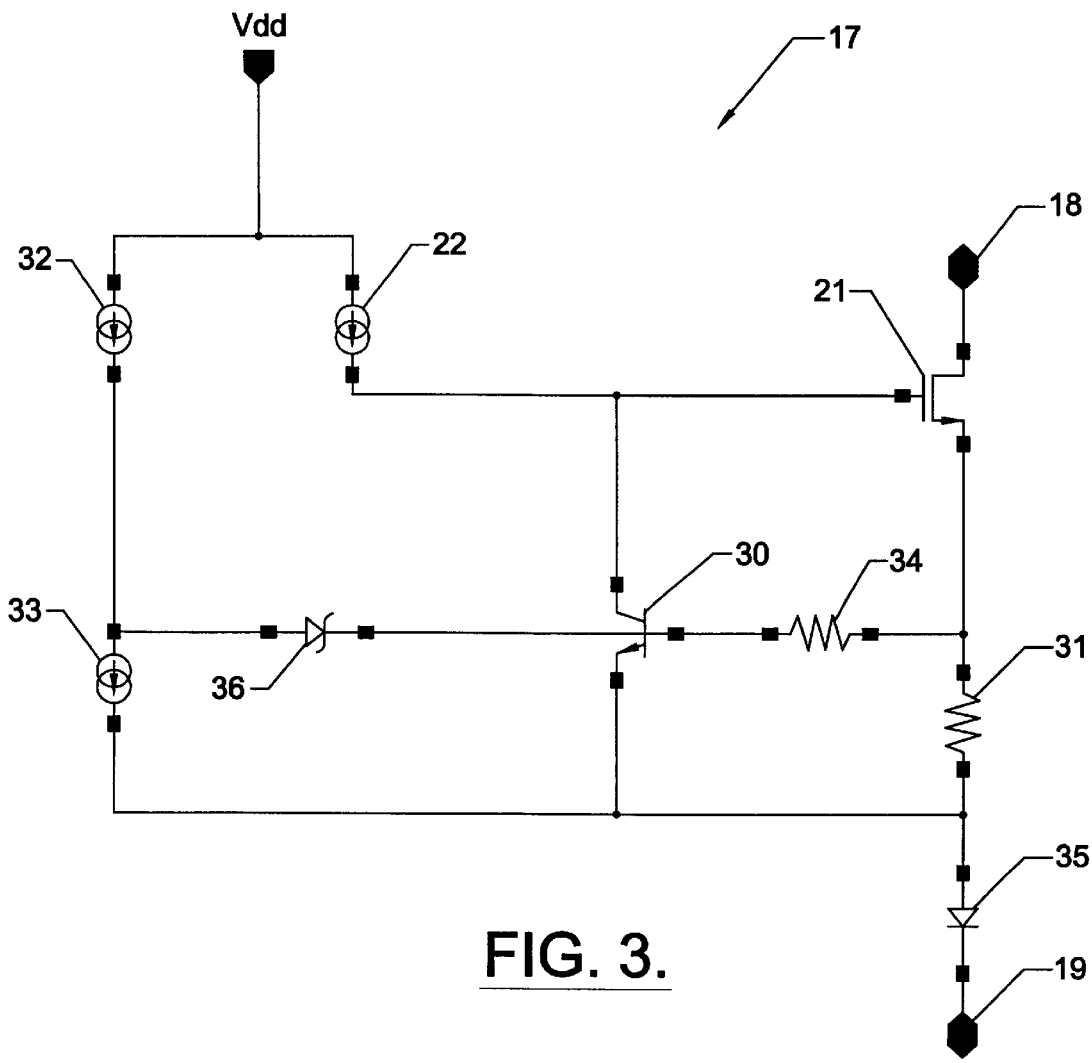
FIG. 3 is a more detailed schematic diagram of one embodiment of the switch of FIG. 2.

A first embodiment of the switch 17 for controlling the current limit as a function of die temperature is shown in FIG. 3. The switch 17 is a unidirectional switch including a single MOS output transistor 21 (e.g., a DMOS transistor) having a conduction terminal connected to the first switch terminal 18. The output MOS transistor 21 is driven at its gate by the driving current source 22, which in turn is connected to a supply voltage Vdd. A Zener diode 36 may be used to limit the voltage at the gate of the output MOS transistor 21.

In the switch 17, the current limiter 23 includes a bipolar transistor 30 and a sensing resistor 31 connected between the output MOS transistor 18 and the second switch terminal 19. The bipolar transistor illustrated in FIG. 3 is an NPN transistor, though other suitable transistor types (e.g., PNP) may also be used, as will be appreciated by those of skill in the art. The bipolar transistor 30 controls driving of the output MOS transistor 21 based upon a voltage drop across the sensing resistor 31. More specifically, when the IR drop across the resistor 31 reaches a predetermined threshold, the bipolar NPN transistor turns on and reduces the voltage at the gate of the output MOS transistor 21 to limit the current through the switch 17.

As noted above, in prior art circuits which use such current limiting configurations the current limit will depend on the ability to accurately control the value of the sensing resistor 31. The sensing resistor 31 typically has a low resistance value, as will be appreciated by those of skill in the art. The current limit will also vary with temperature. That is, as temperature increases the base-emitter voltage Vbe of the bipolar transistor 30 goes down, resulting in a decreasing current limit with temperature. The sensing resistor 31 also will have a temperature coefficient, which typically is positive for diffused resistors.

According to the invention, the controller 24 allows enhanced control over the shape of the current limit versus temperature curve. More specifically, the controller 24 causes the current limiter 23 to decrease the current limit based upon an increase in temperature of the switch 17. The controller 24 includes first and second control current sources 32, 33, a limiting resistor 34, and a diode 35. The first control current source 32 provides a first control current to the bipolar transistor 30. The limiting resistor 34 is connected between the first control current source 32 and the output MOS transistor 21. Furthermore, the diode 35 is connected at its cathode to the second switch terminal 19 and at its anode receives a second control current from the second control current source 33.

The limiting resistor 34 preferably has a much larger resistance value than that of the sensing resistor 31. Accordingly, when the first and second control currents are applied, the current limit will decrease because of the additional IR drop across the limiting resistor 34. If the first and second control currents are high enough to cause sufficient drop across the limiting resistor 34 to turn on the bipolar transistor 30, then the current through the switch can be turned off. Further, if the value of the limiting resistor 34 is sufficiently high, then the driving current flowing into the output MOS transistor 21 can be made very small.

More specifically, the first control current source 32 may be a KT/Q type current source (such as a proportional-to-absolute temperature current source, for example). Thus, the first control current will be based upon a thermal voltage KT/Q, as will be appreciated by those of skill in the art. The second control current source 33 may be a Vbe/R type current source, in which a reference current is made to flow trough a transistor and the output current is proportional to the base-emitter voltage of the transistor. Such current sources are also known to those skilled in the art.

Accordingly, the first control current from the KT/Q current source 32 increases with the temperature of the switch 17 while the second current from the Vbe/R current source 33 decreases. The values of the first and second control current sources 32, 33 may be set such that the first control current (i.e., the KT/Q current) is equal to the second control current (i.e., the Vbe/R current) at a predetermined temperature. Above this predetermined temperature, excess current will flow into the limiting resistor 34. The IR drop across the limiting resistor 34 adds to the drop across the sensing resistor 31 and reduces the current limit. As a result, by using scaled resistors of the same type to develop the first and second control currents as well as the limiting resistor 34, a repeatable, accurate current limit with respect to temperature can be achieved.

By way of comparison, in some prior art approaches a thermal shutdown switch is used to control current limit based upon die temperature. That is, such prior art switches typically sense the temperature of the die and turn the switch off at a predetermined temperature. Some thermal hysteresis is typically used to provide a slower oscillation of on-to-off-to-on as cooling and heating occurs. This approach can be effective in preventing burn out, but those skilled in the art will appreciate that it can also introduce noise into the system because of the digital nature of the turn on and turn off transition.

Figure 4:
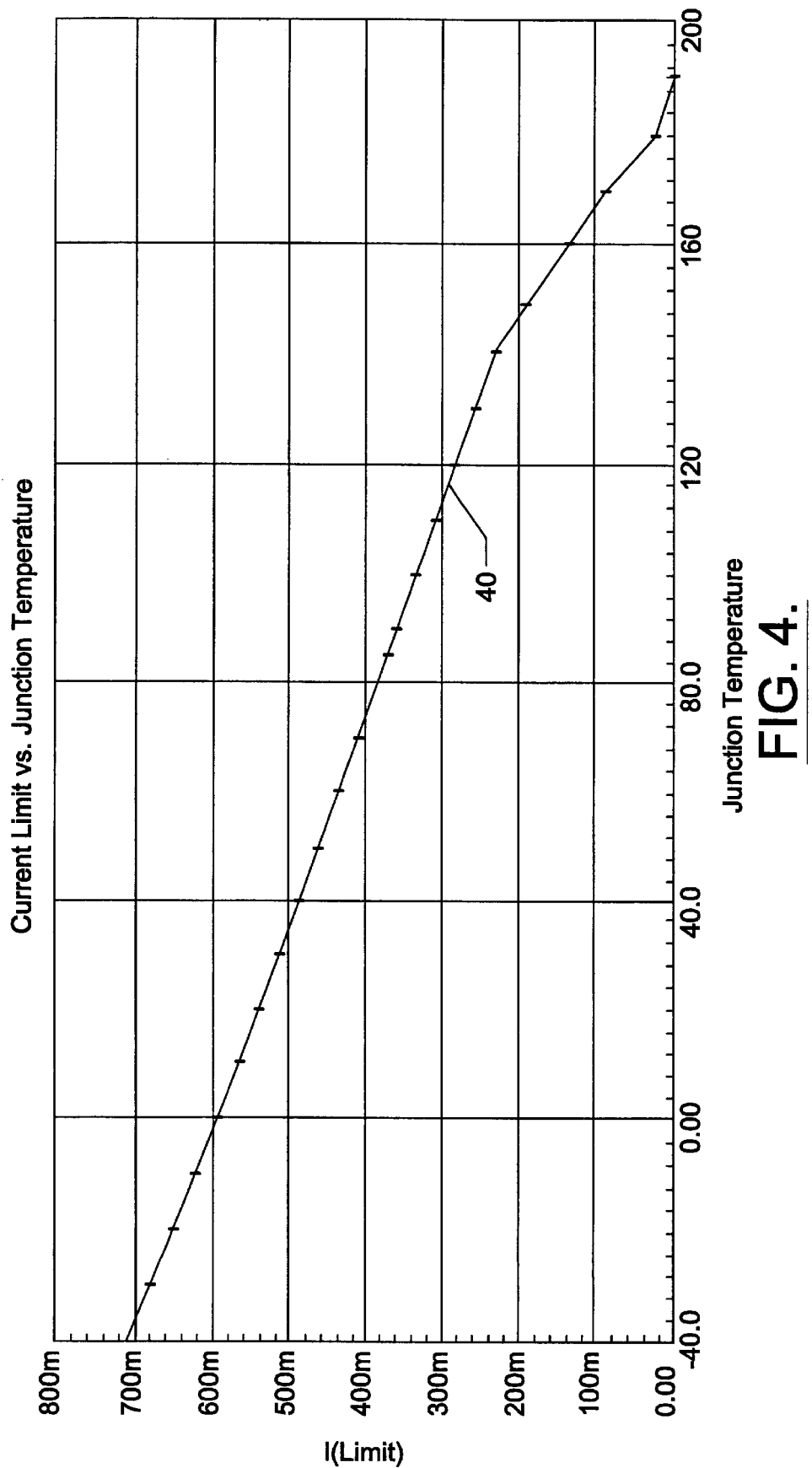
FIG. 4 is a graph illustrating current limit versus temperature for the switch of FIG. 3.

In contrast, the shape of the current limit (I(limit)) versus temperature curve for the switch 17 is controlled such that the current limit goes to zero at a predetermined temperature, as shown in FIG. 4. Here, the predetermined temperature is 140° C. The switch will then settle to some current and temperature during fault conditions which will protect the switch while introducing substantially no transient noise associated with digital switching. Thus, the potential for damage to the switch 17 is reduced while simultaneously reducing the introduction of noise.

Figure 5:
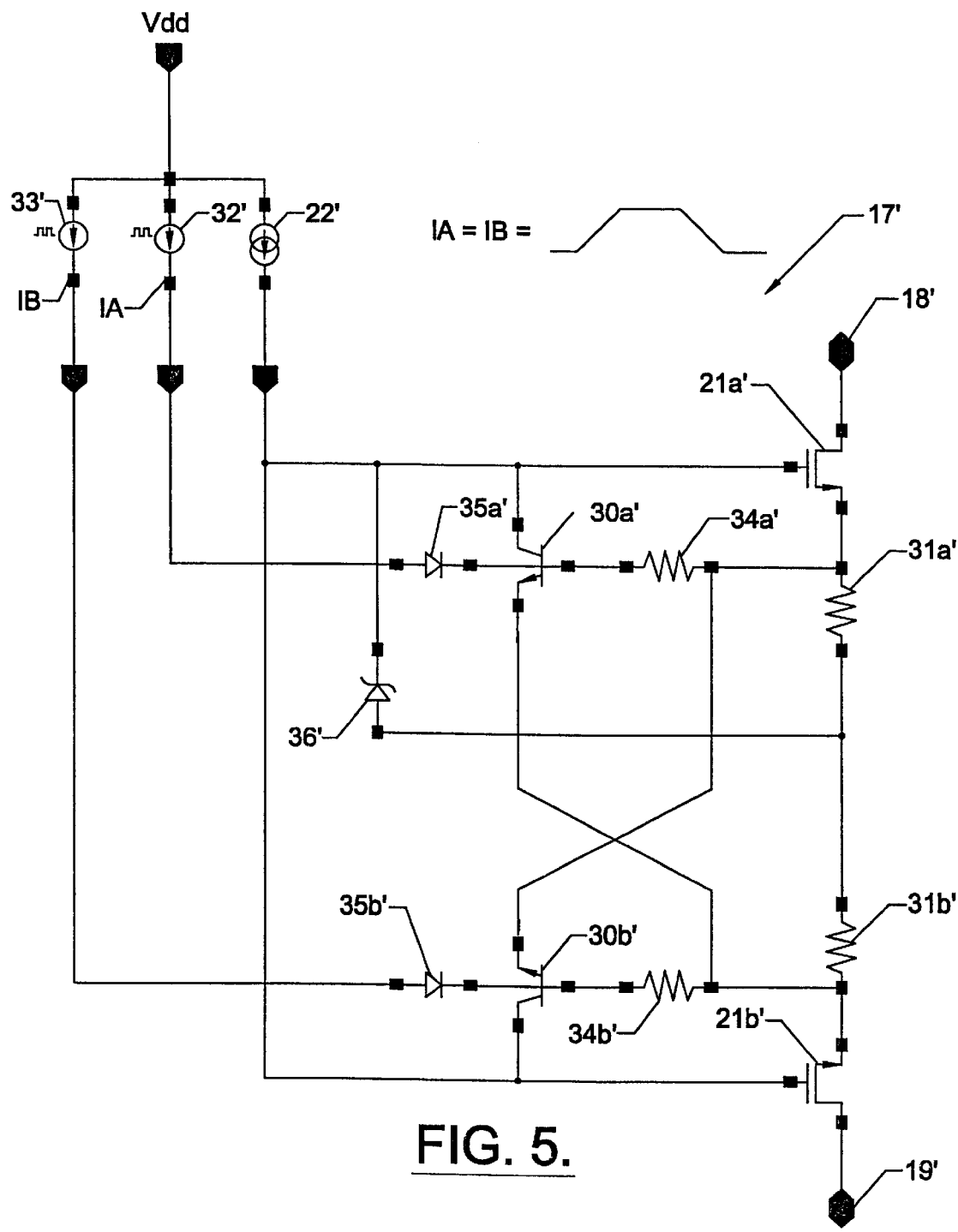
FIG. 5 is a more detailed schematic diagram of another embodiment of the switch of FIG. 2.

Turning now to FIG. 5, another embodiment of a switch 17' according to the invention which provides improved switch timing control is shown. The switch 17' is similar to the switch 17 discussed above with respect to FIG. 3. As such, only the differences therebetween will be discussed below for clarity of explanation. The switch 17' is a bidirectional switch and therefore includes first and second output MOS transistors 21a', 21b' connected in series between the first and second switch terminals 18', 19'. Accordingly, the switch 17' correspondingly includes first and second bipolar transistors 30a', 30b' for respectively controlling driving of the first and second MOS transistors 21a', 21b' by the driving current source 22'.

The switch 17' further includes first and second sensing resistors 31a', 31b' connected between the first and second output MOS transistors 21a', 21b'. As such, driving of the first and second output MOS transistors 21a', 21b' is controlled based upon a voltage drop across the first and second sensing resistors 31a', 31b'. Of course, those of skill in the art will appreciate that other configurations of sensing resistors are possible in addition to those discussed herein.

The first and second control current sources 32', 33' are each respectively connected to the first and second bipolar transistors 30a', 30b'. Further, rather than the single limiting resistor 34, a first limiting resistor 34a' is connected between the first control current source 32' and the first output MOS transistor 21a', and a second limiting resistor 34b' is connected between the second control current source 33' and the second output MOS transistor 21b'. Again, the first and second limiting resistors 34a', 34b' preferably have greater resistances than the first and second sensing resistors 31a', 31b'.

As noted above, control of the rise and fall times of switch turn on and turn off can be used to reduce impulse noise in many applications, particularly in the subscriber loop 12. According to the invention, by controlling these timing factors make-before-break or break-before-make may be achieved using the switch 17'. During operation, the driving current source 22' may be on all the time and may have a low value of about 100 nA. The switching event is controlled by the first and second control current sources 32', 33'.

The control current sources 32', 33' may be set to the same value and timing. Thus, when these two current sources are ramped on, the current limit decreases proportionally to the value of these currents. That is, the first and second currents periodically decrease the current limit to control the rise and fall times of the first and second output MOS transistors 31a', 31b'. When the first and second control currents (IA and IB in FIG. 5) reach a value such that the IR drop across the first and second limiting resistors 34a', 34b' is sufficient to turn on the first and second bipolar transistors 30a', 30b', the switch 17' is turned off. The maximum value of the current through the first and second limiting resistors 34a', 34b' may be about 1 $\mu$A, for example. The current present when the switch is in the off position may be about 2.1 $\mu$A and are negligible in many applications.

Those of skill in the art will therefore appreciate that improved control of the rise and fall times for turn on and turn off of the switch 17' may be achieved. Of course, while the value of first and second control currents are usually equal in value and rate, they may be set differently to achieve different rates for different polarity switch operation. Furthermore, the driving current source 22 and first and second control current sources 32, 33 may either be integrated in the same circuit as the remainder of the switch 17' or may be separately provided.

Moreover, the switch according to the invention (or portions thereof) may be incorporated into a SLIC circuit (or other integrated circuit) and does not necessarily have to be external thereto. The unidirectional switch 17 discussed above may also be particularly useful for switching the $V_{BAT}$ supply in telephone applications, for example, as will be appreciated by those of skill in the art. Furthermore, the bidirectional switch 17' may be used for switching a ringing signal in and out of a digital subscriber line (DSL) without substantially disturbing the DSL signals, as will also be appreciated by those of skill in the art. Such applications may use transformers, etc., rather than a SLIC, as described above.

Additionally, various combinations of the above features, which were illustrated separately in the above embodiments for clarity of explanation, may be present in a single switch according to invention. That is, such a switch may provide both timing and temperature based control, or just one or the other. Also, such switch may be either unidirectional or bi-directional. Additionally, the switch according to the present invention is not limited in application to telephone networks, and may more generally be used in any high power application where enhanced temperature and timing control is required.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that other modifications and embodiments are intended to be included within the scope of the appended claims.

That which is claimed is:

1. An integrated circuit comprising:
    first and second switch terminals;
    at least one output MOS transistor for selectively connecting said first and second switch terminals;
    a driving current source for driving said at least one output MOS transistor;
    a current limiter for limiting the driving of said at least one output MOS transistor by said driving current source to establish a current limit; and
    a controller for said current limiter for controlling the current limit.

2. The integrated circuit of claim 1 wherein said controller causes said current limiter to decrease the current limit based upon an increase in temperature of said integrated circuit.

3. The integrated circuit of claim 1 wherein said controller causes said current limiter to decrease the current limit at periodic intervals to control rise and fall times of said at least one output MOS transistor.

4. The integrated circuit of claim 1 wherein said controller comprises:
    at least one control current source providing at least one control current to said current limiter; and
    at least one limiting resistor connected between said at least one control current source and said at least one output MOS transistor.

5. The integrated circuit of claim 4 wherein said at least one control current source comprises first and second control current sources; wherein said first control current source is connected to said current limiter; wherein said at least one MOS output transistor has a conduction terminal connected to the first switch terminal; and wherein said second control current source is connected to the second switch terminal.

6. The integrated circuit of claim 5 further comprising a diode connecting said second control current source to the second switch terminal.

7. The integrated circuit of claim 5 wherein said first control current source comprises a KT/Q current source; and wherein said second control current source comprises a $V_{BE}/R$ current source.

8. The integrated circuit of claim 4 wherein said at least one output MOS transistor comprises first and second output MOS transistors connected in series between said first and second switch terminals.

9. The integrated circuit of claim 8 wherein said current limiter comprises first and second bipolar transistors for respectively controlling driving of said first and second MOS transistors by said driving current source.

10. The integrated circuit of claim 9 wherein said at least one control current source comprises first and second control current sources each respectively connected to said first and second bipolar transistors; and wherein said at least one limiting resistor comprises a first limiting resistor connected between said first control current source and said first output MOS transistor and a second limiting resistor connected between said second control current source and said second output MOS transistor.

11. The integrated circuit of claim 4 wherein said current limiter comprises at least one sensing resistor connected between the first and second switch terminals; and wherein said current limiter controls driving of said at least one output MOS transistor based upon a voltage drop across said at least one sensing resistor.

12. The integrated circuit of claim 11 wherein said at least one limiting resistor has a greater resistance than said at least one sensing resistor.

13. An integrated circuit comprising:
    first and second switch terminals;
    at least one output MOS transistor for selectively connecting said first and second switch terminals;
    a driving current source for driving said at least one output MOS transistor;
    a current limiter for limiting the driving of said at least one output MOS transistor by said driving current source to establish a current limit; and
    a controller comprising
        at least one control current source providing at least one control current to said current limiter, and
        at least one limiting resistor connected between said at least one control current source and said at least one output MOS transistor;
    said controller causing said current limiter to decrease the current limit based upon an increase in temperature of said integrated circuit.

14. The integrated circuit of claim 13 wherein said at least one control current source comprises first and second control current sources; wherein said first control current source is connected to said current limiter; wherein said at least one MOS output transistor has a conduction terminal connected to the first switch terminal; and wherein said second control current source is connected to the second switch terminal.

15. The integrated circuit of claim 14 further comprising a diode connecting said second control current source to the second switch terminal.

16. The integrated circuit of claim 13 wherein said current limiter comprises a bipolar transistor and at least one sensing resistor connected between the first and second switch terminals and connected to said bipolar transistor; and wherein said bipolar transistor controls driving of said at least one output MOS transistor based upon a voltage drop across said at least one sensing resistor.

17. The integrated circuit of claim 16 wherein said at least one limiting resistor has a greater resistance than said at least one sensing resistor.

18. An integrated circuit comprising:

first and second switch terminals;

a first output MOS transistor connected to said first switch terminal;

a second output MOS transistor connected in series between said first MOS transistor and said second switch terminal;

a driving current source for driving said first and second output MOS transistors;

a current limiter for limiting the driving of said first and second output MOS transistors by said driving current source to establish a current limit; and a controller for causing said current limiter to decrease the current limit at periodic intervals to control rise and fall times of said at least one output MOS transistor.

19. The integrated circuit of claim 18 wherein said current limiter comprises first and second bipolar transistors for respectively controlling driving of said first and second output MOS transistors by said driving current source.

20. The integrated circuit of claim 19 wherein said controller comprises:

first and second control current sources each respectively connected to said first and second bipolar transistors;

a first limiting resistor connected between said first control current source and said first output MOS transistor; and a second limiting resistor connected between said second control current source and said second output MOS transistor.

21. The integrated circuit of claim 20 wherein said current limiter comprises at least one sensing resistor connected between said first and second switch terminals; and wherein said current limiter controls driving of said first and second output MOS transistors based upon a voltage drop across said at least one sensing resistor.

22. The integrated circuit of claim 21 wherein said at least one sensing resistor comprises first and second sensing resistors connected in series between said first and second switch terminals; and wherein said first and second limiting resistors have greater resistances than said first and second sensing resistors.

23. A switch for a limiting a current on a telephone subscriber loop comprising:

first and second switch terminals connected in series in the loop;

at least one output MOS transistor for selectively connecting said first and second switch terminals;

a driving current source for driving said at least one output MOS transistor;

a current limiter for limiting the driving of said at least one output MOS transistor by said current source to establish a current limit; and a controller for said current limiter for controlling the current limit.

24. The switch of claim 23 wherein said controller causes said current limiter to decrease the current limit based upon an increase in temperature of said integrated circuit.

25. The switch of claim 23 wherein said controller causes the current limiter to decrease the current limit at periodic intervals to control rise and fall times of said at least one output MOS transistor.

26. The switch of claim 23 wherein said controller comprises:

at least one control current source providing the at least one control current to said current limiter; and at least one limiting resistor connected between said at least one control current source and said at least one output MOS transistor.

27. The switch of claim 26 wherein said at least one control current source comprises first and second control current sources; wherein said first control current source is connected to said current limiter; wherein said at least one MOS output transistor has a conduction terminal connected to the first switch terminal; and wherein said second control current source is connected to the second switch terminal.

28. The switch of claim 27 further comprising a diode connecting said second control current source to the second switch terminal.

29. The switch of claim 27 wherein said first control current source comprises a KT/Q current source; and wherein said second control current source comprises a $V_{BE}/R$ current source.

30. The switch of claim 26 wherein said at least one output MOS transistor comprises first and second output MOS transistors connected in series between said first and second switch terminals.

31. The switch of claim 30 wherein said current limiter comprises first and second bipolar transistors for respectively controlling driving of said first and second MOS transistors by said driving current source.

32. The switch of claim 31 wherein said at least one control current source comprises first and second control current sources each respectively connected to said first and second bipolar transistors; and wherein said at least one limiting resistor comprises a first limiting resistor connected between said first control current source and said first output MOS transistor and a second limiting resistor connected between said second control current source and said second output MOS transistor.

33. The switch of claim 26 wherein said current limiter comprises at least one sensing resistor connected between the first and second switch terminals; and wherein said current limiter controls driving of said at least one output MOS transistor based upon a voltage drop across said at least one sensing resistor.

34. The switch of claim 33 wherein said at least one limiting resistor has a greater resistance than said at least one sensing resistor.

35. A method for limiting current in an integrated circuit comprising first and second switch terminals and at least one output MOS transistor for selectively connecting the first and second switch terminals, the method comprising:

driving the at least one output MOS transistor using a driving current source;

limiting the driving of the at least one output MOS transistor by the driving current source to establish a current limit; and controlling the current limit using a controller.

36. The method of claim 35 wherein controlling the current limit comprises decreasing the current limit based upon an increase in temperature of the integrated circuit.

37. The method of claim 35 wherein controlling the current limit comprises decreasing the current limit at periodic intervals to control rise and fall times of the at least one output MOS transistor.

38. The method of claim 35 wherein limiting the driving of the at least one output MOS transistor comprises:

connecting at least one sensing resistor between the first and second switch terminals; and driving the at least one output MOS transistor based upon a voltage drop across the at least one sensing resistor.

\* \* \* \* \*